US007880762B1

(12) United States Patent
Fernandez et al.

(10) Patent No.: US 7,880,762 B1
(45) Date of Patent: Feb. 1, 2011

(54) DIGITAL TELEVISION WITH SUBSCRIBER CONFERENCE OVERLAY

(75) Inventors: Dennis Fernandez, 1175 Osborn Ave., Atherton, CA (US) 94027; Irene Hu, Los Altos, CA (US)

(73) Assignee: Dennis Fernandez, Atherton, CA (US)

( * ) Notice: Subject to any disclaimer, the term of this patent is extended or adjusted under 35 U.S.C. 154(b) by 388 days.

(21) Appl. No.: 12/112,377

(22) Filed: Apr. 30, 2008

Related U.S. Application Data

(60) Continuation of application No. 11/645,978, filed on Dec. 26, 2006, which is a continuation of application No. 11/586,260, filed on Oct. 24, 2006, now Pat. No. 7,802,275, which is a continuation of application No. 11/585,393, filed on Oct. 23, 2006, which is a continuation of application No. 11/514,647, filed on Sep. 1, 2006, which is a continuation of application No. 11/507,963, filed on Aug. 21, 2006, which is a continuation of application No. 11/059,611, filed on Feb. 15, 2005, now Pat. No. 7,355,621, which is a continuation of application No. 10/444,261, filed on May 22, 2003, now Pat. No. 7,221,387, which is a continuation of application No. 10/026,095, filed on Dec. 21, 2001, now Pat. No. 6,590,602, which is a division of application No. 09/095,390, filed on Jun. 10, 1998, now Pat. No. 6,339,842.

(51) Int. Cl.
*H04N 7/14* (2006.01)
(52) U.S. Cl. .................. 348/14.08; 348/14.09; 725/135
(58) Field of Classification Search ... 348/14.01–14.16; 709/204–206; 725/143, 153, 135, 123
See application file for complete search history.

(56) References Cited

U.S. PATENT DOCUMENTS

| 4,360,827 A | 11/1982 | Braun |
| 4,796,293 A | 1/1989 | Blinken et al. |
| 4,847,698 A | 7/1989 | Freeman |
| 4,855,843 A | 8/1989 | Ive |
| 4,918,516 A | 4/1990 | Freeman |
| 5,038,211 A | 8/1991 | Hallenbeck |
| RE34,340 E | 8/1993 | Freeman |
| 5,243,651 A | 9/1993 | Parikh |
| 5,371,534 A | 12/1994 | Dagdeviren et al. |

(Continued)

FOREIGN PATENT DOCUMENTS

GB 2313251 A 11/1997

(Continued)

OTHER PUBLICATIONS

U.S. Appl. No. 12/239,633, filed Sep. 26, 2008, Fernandez, Dennis.

(Continued)

*Primary Examiner*—Melur Ramakrishnaiah
(74) *Attorney, Agent, or Firm*—Fernandez & Associates, LLP

(57) ABSTRACT

Digital television system overlays subscriber two-way communication during broadcast program delivery to create virtual audience community. Individual or group billing and advertisement is personalized per DTV receiver program viewing and/or conferencing activity. Subscriber receiver includes camera and other media I/O device for multi-way video conferencing. Participants may be added or removed dynamically during programming or conferencing.

2 Claims, 5 Drawing Sheets

U.S. PATENT DOCUMENTS

| | | |
|---|---|---|
| 5,397,133 A | 3/1995 | Penzias |
| 5,440,449 A | 8/1995 | Scheer |
| 5,491,797 A | 2/1996 | Thompson et al. |
| 5,504,933 A | 4/1996 | Saito |
| 5,515,099 A | 5/1996 | Cortjens et al. |
| 5,532,735 A | 7/1996 | Blahut et al. |
| 5,534,914 A | 7/1996 | Flohr et al. |
| 5,541,639 A | 7/1996 | Takatsuki et al. |
| 5,572,248 A | 11/1996 | Allen |
| 5,600,364 A | 2/1997 | Hendricks et al. |
| 5,612,731 A * | 3/1997 | Cheon .................... 725/153 |
| 5,615,131 A * | 3/1997 | Mortensen et al. .......... 709/206 |
| 5,635,979 A | 6/1997 | Kostreski et al. |
| 5,675,375 A | 10/1997 | Riffee |
| 5,689,553 A | 11/1997 | Ahuja et al. |
| 5,696,906 A | 12/1997 | Peters et al. |
| 5,701,161 A | 12/1997 | Williams et al. |
| 5,710,815 A | 1/1998 | Ming et al. |
| 5,729,471 A | 3/1998 | Jain et al. |
| 5,729,549 A | 3/1998 | Kostreski et al. |
| 5,734,413 A | 3/1998 | Lappington et al. |
| 5,775,995 A | 7/1998 | Okamoto |
| 5,795,228 A | 8/1998 | Trumbull et al. |
| 5,815,195 A | 9/1998 | Tam |
| 5,818,513 A | 10/1998 | Sano et al. |
| 5,823,879 A | 10/1998 | Goldberg et al. |
| 5,828,839 A | 10/1998 | Moncreiff |
| 5,880,731 A | 3/1999 | Liles et al. |
| 5,913,040 A | 6/1999 | Rakavy et al. |
| 5,920,642 A | 7/1999 | Merjanian et al. |
| 5,966,442 A | 10/1999 | Sachdev |
| 5,978,855 A | 11/1999 | Metz et al. |
| 5,987,518 A | 11/1999 | Gotwald |
| 5,999,207 A | 12/1999 | Rodriguez et al. |
| 6,006,257 A | 12/1999 | Slezak |
| 6,020,885 A | 2/2000 | Honda |
| 6,023,499 A | 2/2000 | Mansey et al. |
| 6,038,599 A | 3/2000 | Black et al. |
| 6,061,399 A | 5/2000 | Lyons |
| 6,062,981 A | 5/2000 | Luciano, Jr. |
| 6,075,553 A | 6/2000 | Freeman et al. |
| 6,081,830 A | 6/2000 | Schindler |
| 6,084,583 A | 7/2000 | Gerszberg et al. |
| 6,094,213 A | 7/2000 | Mun et al. |
| 6,117,013 A | 9/2000 | Eiba |
| 6,124,882 A | 9/2000 | Voois et al. |
| 6,128,033 A | 10/2000 | Friedel et al. |
| 6,133,912 A | 10/2000 | Montero |
| 6,152,824 A | 11/2000 | Rothschild et al. |
| 6,183,364 B1 | 2/2001 | Trovato |
| 6,205,209 B1 | 3/2001 | Goldberg et al. |
| 6,219,086 B1 | 4/2001 | Murata |
| 6,236,805 B1 | 5/2001 | Sebestyn |
| 6,243,129 B1 | 6/2001 | Deierling |
| 6,287,199 B1 | 9/2001 | McKeown et al. |
| 6,298,088 B1 | 10/2001 | Bhatt et al. |
| 6,396,480 B1 | 5/2002 | Schindler et al. |
| 6,418,214 B1 | 7/2002 | Smythe et al. |
| 6,463,585 B1 | 10/2002 | Hendricks et al. |
| 6,530,840 B1 | 3/2003 | Cuomo et al. |
| 6,621,514 B1 | 9/2003 | Hamilton |
| 6,741,833 B2 | 5/2004 | McCormick et al. |
| 7,120,139 B1 | 10/2006 | Kung et al. |
| 7,383,438 B2 | 6/2008 | Fahrny et al. |
| 2002/0059581 A1 | 5/2002 | Billock et al. |
| 2005/0198140 A1 | 9/2005 | Itoh et al. |

FOREIGN PATENT DOCUMENTS

| | | |
|---|---|---|
| JP | 02-084177 | 12/1991 |
| JP | 403283982 | 12/1991 |
| JP | 03-143060 | 12/1992 |
| JP | 404367040 | 12/1992 |
| JP | 05-145918 | 6/1993 |
| JP | 05-091505 | 9/1993 |
| JP | 05-316107 A | 11/1993 |
| JP | 406269004 A | 9/1994 |
| JP | 05-160913 | 1/1995 |
| JP | 407023356 | 1/1995 |
| JP | 06-266553 | 5/1996 |
| JP | 08-130724 | 5/1996 |
| JP | 08-222068 | 3/1998 |
| JP | 10-065984 | 3/1998 |

OTHER PUBLICATIONS

U.S. Appl. No. 12/353,776, filed Jan. 14, 2009, Fernandez, Dennis.
U.S. Appl. No. 12/353,694, filed Jan. 14, 2009, Fernandez, Dennis.
U.S. Appl. No. 10/685,354, filed Apr. 14, 2005, Chen, Michael.
U.S. Appl. No. 09/903,973, filed Oct. 24, 2002, Schrader et al.
U.S. Appl. No. 09/992,848, filed Jun. 27, 2002, Feierbach, Wolfgang.
U.S. Appl. No. 11/514,647, filed Sep. 1, 2006, Fernandez.
U.S. Appl. No. 11/507,963, filed Aug. 21, 2006, Fernandez.
U.S. Appl. No. 11/059,611, filed Feb. 15, 2005, Fernandez.
U.S. Appl. No. 10/444,261, filed May 22, 2003, Fernandez.
U.S. Appl. No. 10/026,095, filed Dec. 21, 2001, Fernandez.
U.S. Appl. No. 09/095,390, filed Jun. 10, 1998, Fernandez.
U.S. Appl. No. 11/645,978, filed Dec. 26, 2006, Fernandez.
U.S. Appl. No. 11/586,260, filed Oct. 24, 2006, Fernandez.
U.S. Appl. No. 11/585,393, filed Oct. 23, 2006, Fernandez.
Battle Forecasts Predicts 10 Most Innovative Products for 2006. <http://www.battle.org/news/96/>.
Dawson, F. "Video Perks Give Data a Sharp Image", Sep. 1997, Communication Engineering & Design <http://www.cedmagazine.com/ced/9709/9709d.htm>, 7 pages.
EURESCOM, Management of Multimedia Services, vol. 3: Project P610 Methodologies and case study service selection criteria for management of multimedia services, Feb. 1997.
Hara, Yoshiko. "Japan to begin DTV broadcasts in December", EETimes. 2003. 4.18. <http://www.eetimes.com/story/OEG2003041850042>.
Jones, J. "Projecting the Television Audience in the Digital Future", Vienna, Austria. 1998. <http://www.cpb.org/library/presentations/esomar.html>.
Mitchell, N, "Trimedia White Paper: A Programmable Architecture for Digital Television", 1998 National Association of Broadcasters Convention, Las Vegas NV, Apr. 9, 1998.
Othman, S.Y., "White Paper: Interactive Data Services for Television, System Design Issues". <http://www.teralogic-inc.com/products/internettv/WhitePaper1/html>. Mar. 1998.
Vedro, S., "Beyond the VBI-High Speed Datacasting and Enhanced TV", info.p@ckets, No. 32, Dec. 1997. <http://www.cpb.org/library/infopackets/packet32.html>.
Yang Sung-Jin, "Samsung. Lg Plan digital TV as new cas cow," The Korea Herald, Apr. 21, 2003. www.koreaherald.co.kr/servlot/cms.articleview.
David Seachrist, "Videoconferencing software is the next best thing to being here," http:www.byte.com/art/9709/sec10/art1.htm, Sep. 1997, 9 pgs.
http://en.wikipedia.org/wiki/Broadband.
http://www.blizzard.com/us/diablo/.
http://eu.blizzard.com/en/press/10-years-diablo.html.
http://www.replacementdocs.com/download.php?view.2101.
http://us.blizzard.com/support/article.xml?, articleId=20805&categoryId=2652&parentCategoryId=&pageNumber=1.
http://en.wikipedia.org/wiki/Battle.net.
http://www.uninformed.org/?v=2.
http://www.uninformed.org/?v=2&a=1&t=pdf.
http://us.blizzard.com/support/article.xml?articleId=21119.
http://en.wikipedia.org/wiki/Meridian_59.
http://meridian59.neardeathstudios.com/M59-About-Excellence.shtml.
http://meridian59.neardeathstudios.com/M59-About-NewToGames.shtml.

http://billing.neardeathstudios.com/M59-Billing-FAQ-01.shtml.
http://en.wikipedia.org/wiki/Ultima_Online.
http://guide.uo.com/miscellaneous_0.html.
http://guide.uo.com/start3d_16.html.
http://www.uo.com/billingmanual.html.

U.S. Appl. No. 12/541,034, filed Aug. 13, 2009, Fernandez, et al.
Jay, Frank (ed.). "Simulation," IEEE Standard Dictionary of Electrical and Electronics Terms, 1998, p. 902, 4th Edition Std 100-1988, ANSI/IEEE.

* cited by examiner

DIGITAL TELEVISION WITH SUBSCRIBER CONFERENCE OVERLAY

RELATED APPLICATION DATA

This application is a continuation application of U.S. patent application Ser. No. 11/645,978 filed on Dec. 26, 2006, which is a continuation of Ser. No. 11/586,260 filed on Oct. 24, 2006, now U.S. Pat. No. 7,802,275 which is a continuation of Ser. No. 11/585,393 filed on Oct. 23, 2006, which is a continuation of Ser. No. 11/514,647 filed on Sep. 1, 2006, which is a continuation of Ser. No. 11/507,963 filed on Aug. 21, 2006, which is a continuation application of Ser. No. 11/059,611 filed on Feb. 15, 2005, now U.S. Pat. No. 7,355,621 which is a continuation application of Ser. No. 10/444,261 filed on May 22, 2003, now U.S. Pat. No. 7,221,387, which is a continuation application of Ser. No. 10/026,095 filed Dec. 21, 2001 issued as U.S. Pat. No. 6,590,602, which is a divisional application of Ser. No. 09/095,390 filed Jun. 10, 1998 issued as U.S. Pat. No. 6,339,842

FIELD OF INVENTION

The invention relates to digital television systems, particularly to subscriber video conferencing with conventional programming.

BACKGROUND OF INVENTION

Digital television (DTV) attributes have been standardized by industry (e.g., Advanced Television Systems Committee (ATSC) and government (U.S. Federal Communications Commission (FCC)). Such DTV standards, which provide enhanced multimedia quality, as well as interactive data services, are hereby incorporated by reference. Generally, however, DTV specifications contemplate program delivery to various receiver units, but not necessarily communication between receiver units. Accordingly, there may be need for conferencing between units receiving digital system programming.

SUMMARY OF INVENTION

The invention resides in digital television system configured for subscriber conference overlay during program delivery. Billing and advertisement may be personalized according to actual program viewing and/or conferencing activity by DTV receiver. Receiver unit includes media input/output device for multi-user conferencing. Subscribers may be added or removed during programming.

DETAILED DESCRIPTION

Figure 1:
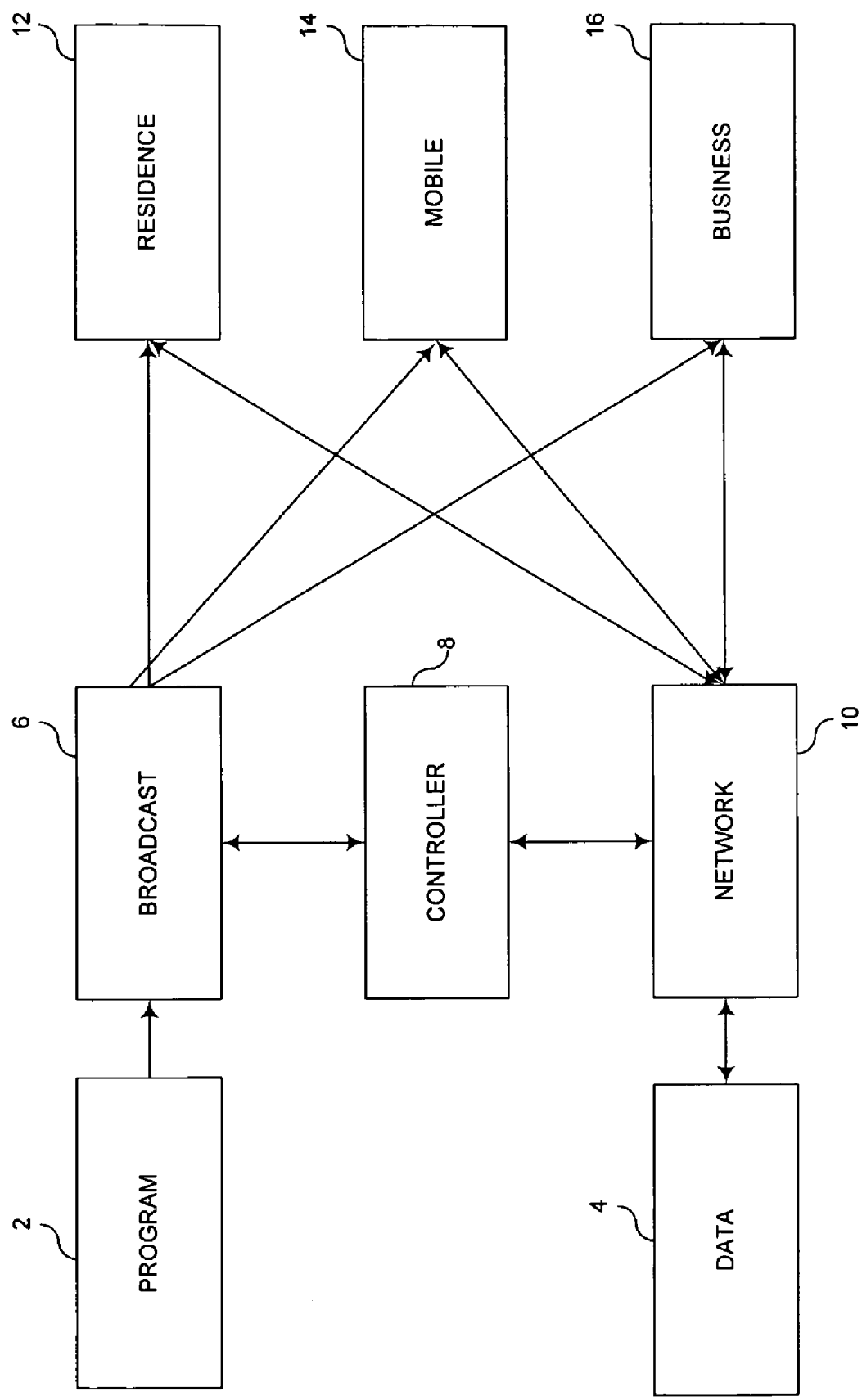
FIG. 1 is block diagram of integrated digital television program and data delivery system for enabling present invention.

FIG. 1 is block diagram of integrated digital television program and data delivery system, including one or more residential 12, mobile 14 and business 16 subscriber, receiver and/or digital television (DTV) units coupled over broadcast 6 and/or network 10 channels respectively to program 2 and/or data 4 sources. Controller 8, which is one or more processor, server, computer or other functionally equivalent controller functionality coupled to broadcast 6 and/or network 10 channel, may affect network 10 and broadcast 6 functionality as described herein.

Program source 2 comprises one or more source for broadcasting one or more video and/or data programs, or other functionally equivalent information signal stream, according to conventional digital and/or analog program broadcasting, accessible or addressable publicly or privately over various broadcast 6 equipment, medium, or other functionally equivalent channels, such as cable, optical fiber, microwave, wireless radio frequency (RF) transmission, direct broadcast satellite (DBS), multichannel multipoint distribution system (MMDS), local multipoint distribution service (LMDS), etc. For example, program 2 may comprise live sports or entertainment performance event, such as professional football game, broadcast over restricted pay-per-view television channels.

Data source 4 comprises one or more source for providing two-way or interactive access to one or more database, file, directory, or other functionally equivalent data repository site or signal source, accessible or addressable publicly or privately over conventional network 10, such as local or wide area network, world-wide web Internet/intranet, or combination thereof, including, for example, network switch, router, bridge, gateway, hub, or other wired and/or wireless networking connection equipment for enabling ISDN, SONET, ATM, frame relay, gigabit Ethernet, TCP/IP, virtual private networks, xDSL, or other similar functionality. Additionally, data 4 may comprise text, graphics, video, or other digital or media information, such as current news update, photographic images, video or audio clips, sports statistics or analysis, stock quotes or financial data, weather forecast report, research data, commercial transaction details, product pricing, etc.

In accordance with important aspect of present invention, digital television system includes multiple receivers coupled selectively or programmably to program 2 and/or data 4 source over broadcast 6 and/or network 10 communications infrastructure, wherein conferencing or communication among DTV subscribers 18 occurs during program and/or data delivery. Consequently, controller 8 may send or transmit service bill indication to participating DTV units per actual program view or conference usage. As used herein, term "conference" or "conferencing" is interpreted broadly and understood to mean any communication between multiple parties.

Additionally, controller may facilitate electronic narrowcast delivery of personalized or customized commercial and/or non-commercial message to select DTV units. Controller 8 and/or subscribers 18 may employ one or more intelligent agents or functionally equivalent software constructs to search, obtain, or transact certain information or activity across network 10. Controller 8 or subscriber unit 18 processor may selectively restrict or censor pre-defined program or data classes or titles, for example, to content screening criteria and/or procedure provided for so-called V-chip specifications. Preferably, each DTV receiver includes searchable and/or identifiable address and various multimedia input/output device capability for enabling video conferencing. Moreover, DTV units may be added or removed during conference period.

Figure 2:
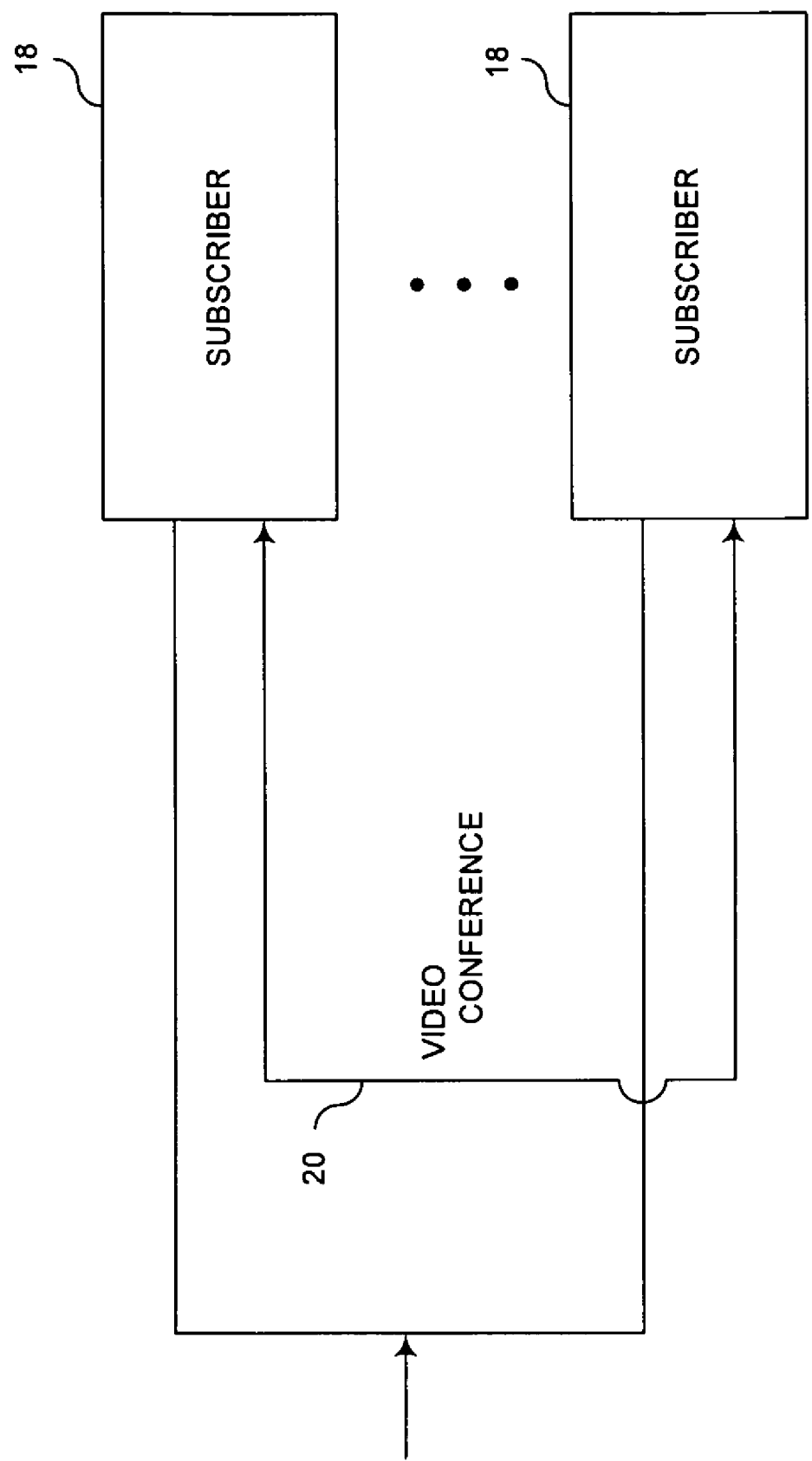
FIG. 2 is simplified diagram of novel overlay of subscriber conferencing over program and/or data delivery.

Accordingly, FIG. 2 shows overlay of subscriber conferencing 20 over program and/or data delivery to subscribers 18. In this networked configuration, controller 8 effectively serves as broadband system headend processor for generating, forwarding, modifying, storing, accessing or otherwise controlling program/data delivery to subscribers 18, while generating, forwarding, modifying, storing, accessing or otherwise controlling video conferencing signal transmission between subscribers 18.

Preferably, such program/data signal generated, transmitted or otherwise processed to receiver units comply with established DTV standards, such as ATSC or other generally accepted industry DTV information or signal format and/or protocol interface, and video conferencing signal generated, transmitted or otherwise processed between receiver units comply with established video conferencing standards, such as H.323, H.324, H.320, T.120 or other generally accepted industry video/data conferencing information or signal format and/or protocol interface, such currently published or online-accessible standards being hereby incorporated by reference.

Figure 3:
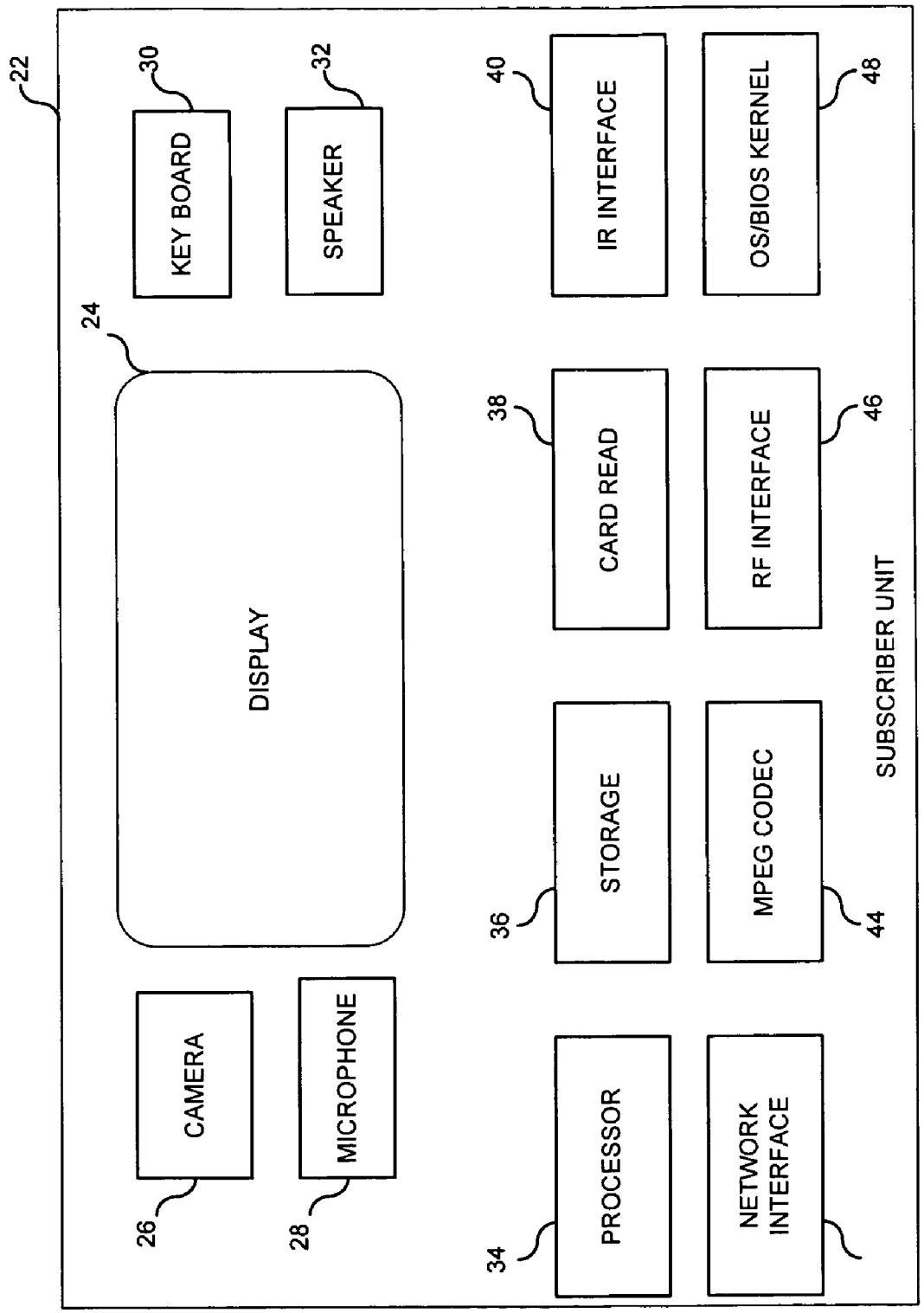
FIG. 3 is representative digital TV subscriber unit used according to present invention.

FIG. 3 shows digital television subscriber unit 22, which may be implemented as one or more DTV receivers 12, 14, or 16 of FIG. 1. Preferably, DTV unit 22, which functions in compliance with Advanced Television Systems Committee (ATSC) standard for DTV equipment and system operation, substantially includes display panel or screen with video frame buffer 24, digital video-conferencing camera or image sensor 26, microphone 28, keyboard and/or mouse 30, speaker(s) 32, processor or controller 34, digital memory or recordable video disk storage 36, peripheral card reader 38, remote control infrared interface 40, network interface or modem 42 (e.g., for coupling to network channel 10), digital compressed video encoder/decoder (i.e., according to Moving Pictures Experts Group (MPEG) industry standards)), radio frequency (RF), broadband or wireless communications interface 46 (e.g., for coupling to broadcast channel 6), and operating system, BIOS, browser, or other associated kernel software 48 for generally enabling system and controller 34 operation and network communications.

It is contemplated that ATSC-compliant DTV unit 22 may be embodied as well in personal or network computer, workstation, set-top television device, or functionally equivalent processing and associated network equipment, as configured to operate as specified herein according to present invention.

Moreover, controllers 8, 34 execute one or more computer programs for performing functions as described herein, preferably according to embedded or real-time software syntax, such as JAVA and/or Windows CE, which currently published or on-line specifications are hereby incorporated by reference.

Figure 4:
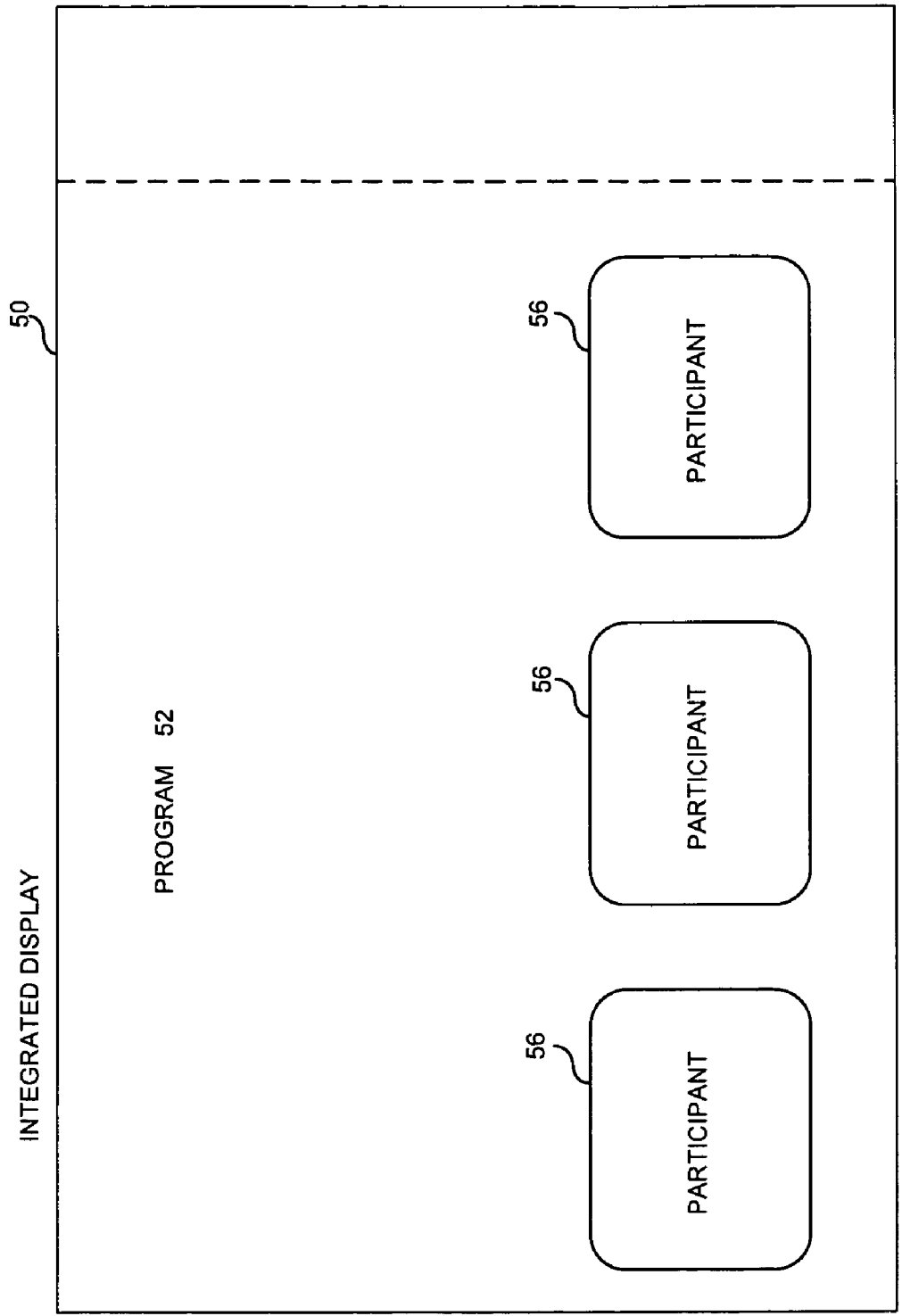
FIG. 4 is sample digital TV display according to present invention.

When DTV unit 22 operates according to present invention, sample display 24 screen output may be as represented in FIG. 4. In particular, display 24 may integrate, combine, mix, or otherwise include program 52 and/or data 54, effectively through video frame buffer, with video conferencing windows from current (i.e., self) and/or other DTV participants 56 coupled thereto, preferably during program/data delivery. For example, each screen element 52, 54, 56 may be shown as picture within or adjacent to another picture element. In this overlaid manner, each DTV unit in select set displays common program and/or data stream, as well as conference video and audio signal output as generated from video camera and microphone from other participant DTV units.

Preferably, such program and/or video signals are compressed and encoded according to industry standard such as MPEG format. Display 50 may also show whiteboard-type screen commonly among participants 56 for jointly communicating text, graphics, or other observable or audible program or data, such as for workgroup or class collaboration to review or discuss draft documents, faxes, or other forms or files.

Figure 5:
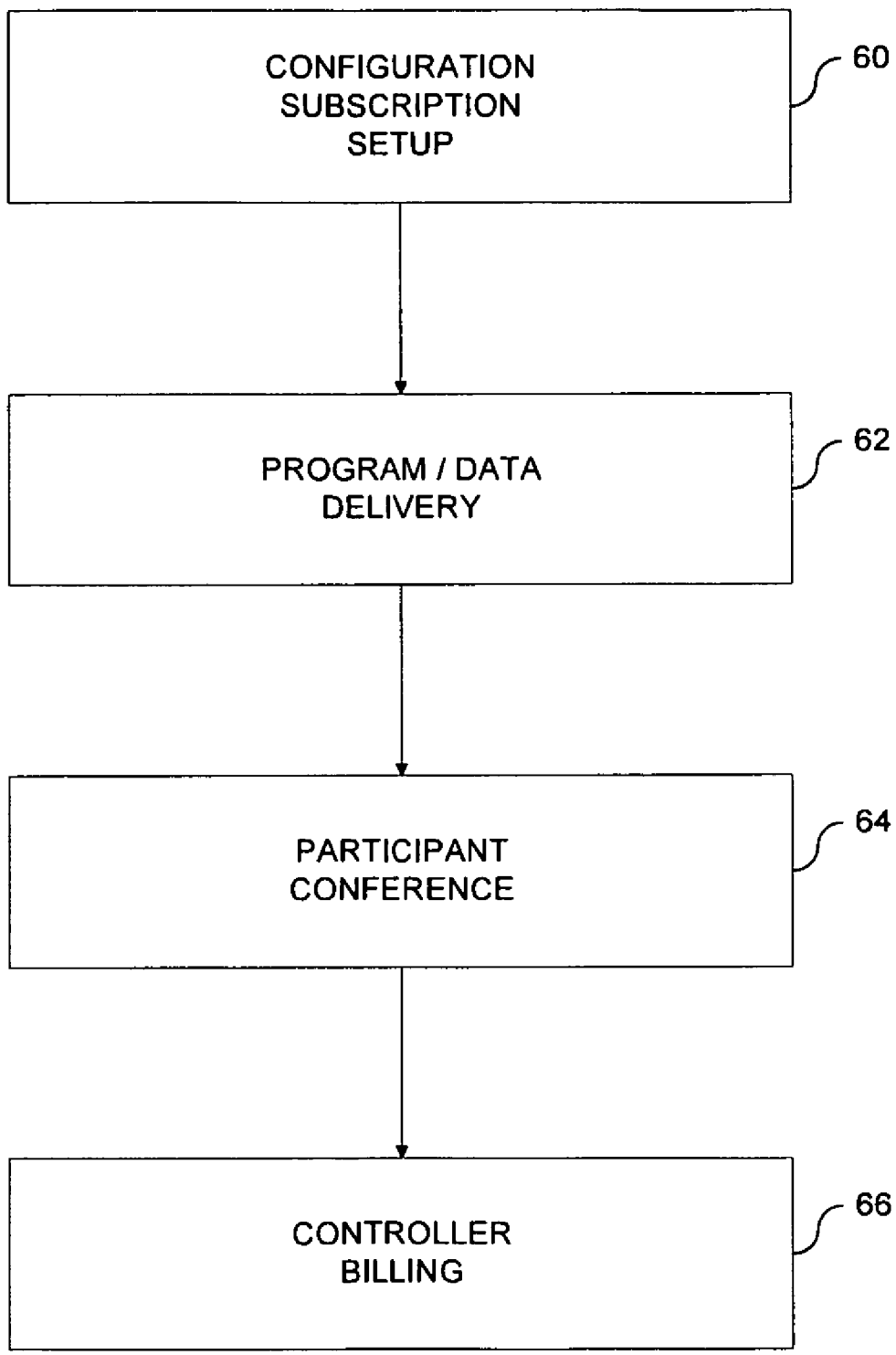
FIG. 5 is flow chart of operational steps of present invention.

FIG. 5 shows operational flow chart, including steps for system configuration and subscription set-up 60, program and/or data delivery 62, participant conference 64, and controller billing 66. Preferably, controller 8, serves as central processor to coordinate DTV unit set-up, user smart-card account authorization or identity authentication program/data and/or conference scheduling, programming, viewing, output formatting, conference access and communication, billing, advertising, and other associated activity, particularly for managing access to program 2, data 4, as well as DTV video conferencing signals 20. To reduce latency, controller 8 may transmit static image instead of live video.

For example, controller 8 may authorize or cause certain DTV units to be added or removed dynamically from one or more video conferencing active set or selected logical group, as well as restrict select DTV unit(s) from viewing certain program and/or data. Moreover, controller 8 monitors one or more actual program/data viewing and/or conferencing usage for appropriate billing. Furthermore, controller 8 may direct personalized or targeted commercial, incentive, or advertising messages to certain recognized demographic interest group, DTV subscribers or participant video conferencing parties.

Preferably, controller 8 directs such messages dynamically or adaptively according to current subscriber or participant information activity or needs, as well as product availability, market pricing, or other commercial attribute. Additionally, controller 8 may take corrective action or functional adjustment to redirect, restrict, control, or otherwise manage network, program/data, or other system resources, upon detecting actual or possible performance bottlenecks or other equipment or connection fault causing undesirable impact on such information delivery.

In one embodiment of present invention, DTV system is configured for luxury-suite type or other effectively exclusive membership multi-user conferenced viewing of live sports event, such that professional football, basketball, baseball, hockey, soccer, or other competitive individual, team, or tournament telecast is provided as program 2 through broadcast channel 6, including preferably statistical or background data 4 about player, team, or other related game aspect. In particular, controller 8 provides proper access by authorized DTV subscribers 18 to such sports program and/or data. Additionally, controller 8 coordinates or monitors video conferencing activity occurring directly or indirectly between DTV units watching common program/data stream.

Hence, for example, initially, during configuration subscription setup phase 60, system or headend controller 8 begins to identify system configuration, network address, program order and account status of any subscriber units coupled thereto over broadcast 6 and/or network 10 channels. Commercial transaction may occur to define DTV receiver unit user subscriptions, particularly for authenticating, billing, scheduling, notifying, requesting or otherwise providing desired access to any upcoming or current program 2 or database 4. As appropriate, controller 8 may conduct remote diagnostics over such channels to various units 12, 14, 16 to ensure proper functioning for signal delivery.

Next, program and/or data delivery may commence according to controller 8 programmable selection to enable digital transmission for electronic signal delivery 62 of certain program 2 and/or data 4 for presentation in integrated display 50 of selected or addressed DTV subscriber units 18. Then, thereafter, prior, or simultaneously, select participants 56 are enabled for video conferencing 20, particularly by allowing such participants to be monitored by activated video camera 26 and/or microphone 28, for transmission of monitored static image or live motion video compressed encoded digital signal for presentation in display screen 50. Upon completion of program/data delivery and conferencing activity, controller 8 may send proper billing indications to participant DTV units. Controller 8 may appropriately add or delete subscriber 18 in active database.

Therefore, in this combined DTV program/data viewing and select viewer conferencing scheme, important objective of emulating luxury-suite or otherwise more collaborative, intimate or personal conditions among associated audience members located at different locations is achieved effectively.

Optionally, while receiving program/data, conferenced subscriber may also send or receive electronic text message to other subscribers or other mail account addressable through network 10, or run various application programs locally or in distributed client-server networked manner, preferably in common with other conferenced DTV units, such as for multi-user simulation or gaming application.

To improve system program/data broadcast or video conferencing performance, for example, when restricted effectively by channel bandwidth or traffic congestion, controllers 8, 34 may reduce or eliminate actual transmission of full content video signal, and preferably transmit information subset, such as static image, text and/or voice.

Foregoing described embodiments of invention are provided as illustration and description. It is not intended to limit invention to precise form described. Other variations and embodiments are possible in light of above teaching, and it is thus intended that scope of invention not be limited by detailed description, but rather by claims as follow.

We claim:

1. Professional sports broadcast service for virtual audience community comprising steps:
   selecting electronically a logical group in a virtual audience to a professional sports broadcast; and
   emulating electronically a luxury suite to enable intimate personal conferencing among the selected group;
   wherein the selected group comprises a virtual community of mobile wireless digital television subscriber units configured for luxury-suite type or exclusive membership multi-subscriber conferenced viewing of one or more live sports event such that competitive tournament telecast or broadcast to such virtual community is provided via a wireless network as a program through a broadcast channel and data through a network channel, a wireless network controller thereby providing multi-channel access of such mobile wireless digital television subscriber units to such program and data, and coordinates or monitors conferencing activity between such mobile wireless digital television subscriber units accessing a common sports program and data stream via the broadcast and network channels.

2. Controller for professional sports broadcast service for virtual audience community comprising:
   means for selecting electronically a logical group in a virtual audience to a professional sports broadcast; and
   means for emulating electronically a luxury suite to enable intimate personal conferencing among the selected group;
   wherein the selected group comprises a virtual community of mobile wireless digital television subscriber units configured for luxury-suite type or exclusive membership multi-subscriber conferenced viewing of one or more live sports event such that competitive tournament telecast or broadcast to such virtual community is provided via a wireless network as a program through a broadcast channel and data through a network channel, a wireless network controller thereby providing multi-channel access of such mobile wireless digital television subscriber units to such program and data, and coordinates or monitors conferencing activity between such mobile wireless digital television subscriber units accessing a common sports program and data stream via the broadcast and network channels.

* * * * *